(12) United States Patent
Nakano et al.

(10) Patent No.: US 10,315,926 B2
(45) Date of Patent: Jun. 11, 2019

(54) SELECTIVE LITHIUM RECOVERY AS LITHIUM CARBONATE FROM NATURAL BRINES

(71) Applicant: United States Department of Energy, Washington, DC (US)

(72) Inventors: Jinichiro Nakano, Albany, OR (US); Anna Nakano, Albany, OR (US); James P. Bennett, Salem, OR (US)

(73) Assignee: U.S. Department of Energy, Washington, DC (US)

( * ) Notice: Subject to any disclaimer, the term of this patent is extended or adjusted under 35 U.S.C. 154(b) by 38 days.

(21) Appl. No.: 15/728,784

(22) Filed: Oct. 10, 2017

(65) Prior Publication Data

US 2018/0222761 A1 Aug. 9, 2018

Related U.S. Application Data

(60) Provisional application No. 62/456,832, filed on Feb. 9, 2017.

(51) Int. Cl.
*C01D 15/08* (2006.01)
*C22C 24/00* (2006.01)

(52) U.S. Cl.
CPC .............. *C01D 15/08* (2013.01); *C22C 24/00* (2013.01); *C01P 2006/80* (2013.01)

(58) Field of Classification Search
CPC ..................................................... C01D 15/08
See application file for complete search history.

(56) References Cited

U.S. PATENT DOCUMENTS

| 2011/0200508 A1* | 8/2011 | Harrison | ............... | C01B 35/063 |
| | | | | 423/276 |
| 2012/0100056 A1* | 4/2012 | Harrison | ............... | C01B 35/063 |
| | | | | 423/276 |

FOREIGN PATENT DOCUMENTS

| CA | 2313524 A1 * | 6/1999 | ............. C01D 15/08 |
| WO | WO-2010006366 A1 * | 1/2010 | ............. C01D 3/06 |
| WO | WO-2013036983 A1 * | 3/2013 | ............. C01D 15/08 |

* cited by examiner

*Primary Examiner* — Melissa S Swain
(74) *Attorney, Agent, or Firm* — Felisa L. Leisinger; Michael J. Dobbs; Brian J. Lally

(57) ABSTRACT

Embodiments relate to methods, systems And apparatus tor generating lithium from brine. The brine is heated in a first vessel to greater than 260° C. and $CO_2$ gas is injected mixing with the brine such that the $CO_2$/P is greater than 18 g/atm. The brine is held at greater than 18 g/atm for longer than 20 minutes so that any impurities precipitate as solids leaving only lithium ions and chlorine ions. The brine is moved to a second vessel screening out solid precipitates leaving a brine containing only chlorine and lithium. $CO_2$ gas is injected and mixed with the brine at 260° C. so that the $CO_2$/P is greater than 200 g/atm. The brine is held at greater than 200 g/atm for longer than 20 minutes suppressing the chlorine as dissolved ions while lithium precipitates out as lithium carbonate. The lithium carbonate precipitate is removed from the brine solution.

15 Claims, 5 Drawing Sheets

SELECTIVE LITHIUM RECOVERY AS LITHIUM CARBONATE FROM NATURAL BRINES

CROSS-REFERENCE TO RELATED APPLICATIONS

This application claims the benefit of U.S. Provisional Application No. 62/456,832, filed Feb. 9, 2017, which is hereby incorporated by reference.

STATEMENT OF GOVERNMENT SUPPORT

The United States Government has rights in this invention pursuant to an employer/employee relationship between the inventors and the U.S. Department of Energy, operators of the National Energy Technology Laboratory (NETL) and site-support contractors at NETL under Contract No.: DE-FE0004000.

TECHNICAL FIELD

This disclosure is generally related to isolating lithium. More specifically, the presented embodiments relate a method of isolating lithium carbonate from a natural brine.

BACKGROUND

Lithium (Li) is used in advanced clean energy technologies including fuel cells, electric vehicles, and other applications as Li-ion batteries. Because of its importance in energy storage devices, it is listed as a near-critical material ($2^{nd}$ highest ranking) element in the US DOE 2011 Critical Materials Strategy. Lithium is often isolated from hypersaline fluids or brines. Natural geothermal brines are hydrothermal fluids heated by natural heat under earth's surface. Natural geothermal brines are an environmentally preferred and renewable energy source.

In the early 1990s, the United States was the largest producer and consumer of lithium minerals and compounds worldwide. Between 1995 and 2004, production shifted to South America where production costs were far lower. Now, the U.S. largely relies on foreign sources of Li due to limited domestic supply.

The current leading technology to extract Li from brines requires a series of football field-sized evaporation ponds, lengthy (approximately 18-24 months) leaching processes, consuming time and energy, and emitting $CO_2$. During the evaporation stage, large quantities of diesel fuel are consumed producing additional carbon dioxide. After concentration, the Li-rich brines are generally required to be transported a long distance to a processing plant that produces Li compounds; such as lithium carbonate ($Li_2CO_3$), lithium chloride, and lithium hydroxide; by multiple carbonation steps. This carbonation process requires various solid additives including: soda ash ($Na_2CO_3$), lime (CaO), hydrochloric acid (HCl), organic solvent, sulfuric acid ($H_2SO_4$), and alcohol. A total of 2.7 ton of the combined additives may be required to produce a ton of $Li_2CO_3$ in these processes. Excluding land transit of the concentrated brine solutions, the currently leading carbonation operation may consume more than 10 GJ/ton $Li_2CO_3$ produced (or $208/ton of $Li_2CO_3$ production@$0.07/kWh).

There is, therefore, a need for a method for domestically generating solid lithium carbonate that requires less time, energy, waste, and is produced at a lower cost than existing technology.

SUMMARY

One or more embodiments relate to methods, systems and apparatus for generating lithium from a natural brine. In one embodiment, the brine is heated in a first vessel to a predetermined temperature and $CO_2$ gas is injected into the first vessel to be mixed with the brine foaming a mixture such that the $CO_2$/P is greater than 6 g/atm where $CO_2$ is the mass of $CO_2$ gas and P the total pressure in the vessel. The mixture is held for a first predetermined time after the $CO_2$ injection, so that any impurities in the brine precipitate as solids leaving only lithium ions and dissolved chlorine ions. Solid precipitates are screened out leaving a brine. $CO_2$ gas is injected into the second brine, mixing so that the $CO_2$/P is greater than 50 g/atm. The mixture is held for a second predetermined time after the $CO_2$ injection, such that chlorine is suppressed as dissolved ions while lithium precipitates out as lithium carbonate as substantially the only solid in the brine.

BRIEF DESCRIPTION OF THE DRAWINGS

These and other features, aspects, and advantages of the multiple embodiments of the present invention will become better understood with reference to the following description, appended claims, and accompanied drawings where:

DETAILED DESCRIPTION OF THE INVENTION

Figure 1:
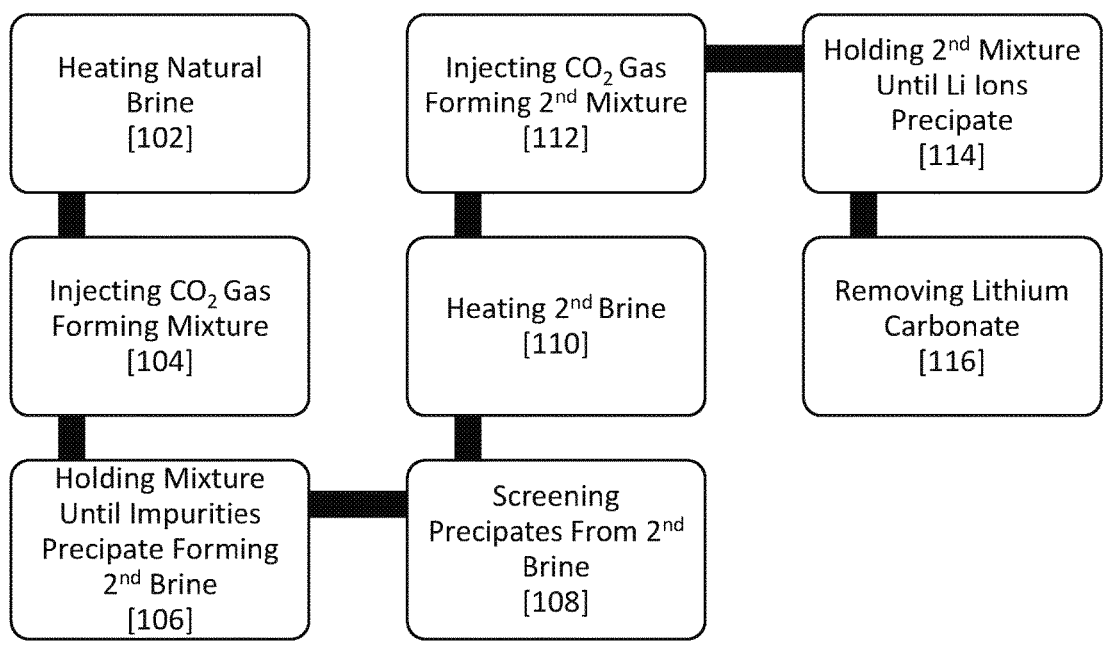
FIG. 1 is a schematic flow diagram illustrating the steps in a lithium generating process according to the invention.

A method for generating lithium (Li) from a natural brine. The $CO_2$/P ($CO_2$ mass over a total pressure of the system) driven recovery approach is two-step: 1) induce selective concentration of Li in natural brine; and 2) carbonize the concentrated Li as illustrated in FIG. 1. Embodiments may be integrated into existing geothermal power plants. Existing geothermal power plants pump out brines for power generation from which lithium can be generated. Additionally, the process generates excess heat while concentrating lithium and producing lithium carbonate product, which can be used for power generation.

The first step of inducing a selective concentration of Li in the natural brine requires the natural brine to be heated 102, injected with a $CO_2$ gas 104, held 106, and have solid precipitates screened out 108. Preferably, a natural brine is used. In one or more embodiments, the natural brine is sea water containing lithium. In another embodiment, rare earth elements may be extracted from a natural brine. In another embodiment, other desired elements may be extracted from a natural brine. The natural brine is heated 102 in a first vessel to a first predetermined temperature. In other embodiments, the first predetermined temperature is at least 200° C. Exemplary embodiments include, the first predetermined temperature is equal to or greater than 260° C. A $CO_2$ gas is injected 104 into the first vessel. The $CO_2$ gas, which is utilized at both stages, may come from natural, industrial or waste sources. Brine treatment through $CO_2$ is targeted because it is a low cost additive with known process controls.

The $CO_2$ gas mixes with the natural brine forming a mixture such that the $CO_2/P$ is greater than 6 g/atm. In an embodiment, the $CO_2/P$ is greater than 18 g/atm. While all thermodynamic parameters are influential including brine chemistry, pressure, temperature, and surface energy one or more embodiments selectively recover Li by adjusting those parameters with a simple $CO_2$ pumping approach. In other embodiments, the $CO_2$ mixes with the natural brine rather than prior art methods of pumping $CO_2$ into the brine. The term 'mixing' vs. 'pumping' herein is defined such that mixing $CO_2$ with the brine requires introduction of $CO_2$ into the brine with simultaneous adjustment of interior pressure, which enables the control of the total pressure with respect to the mass of $CO_2$, whereas merely pumped $CO_2$ will cause corresponding pressure build up inside the vessel, i.e., the $CO_2/P$ ratio will be always a constant this way. By mixing $CO_2$ with the natural brine, Li exhibits the highest dissolution that can be strategically achieved. This is shown through ratios of $CO_2/P$ and by crossing over iso-pressure contours in multiple dimensions consisting of all the parameters. The present invention utilizing 'mixing' rather than mere 'pumping' allows embodiments to have a higher $CO_2$ in solution without increasing P, or lowering P without decreasing $CO_2$, which tactically enables discovery of required thermodynamic domains where the targeted element to be stable or instable. Embodiments enable high recovery rates possible through control of the proposed unique $CO_2/P$ parameter ranges, which distinguishes this invention from conventional $CO_2$ techniques that simply pump $CO_2$ into solutions. Theoretically, by this invention, 100.0% Li, as $Li_2CO_3$, recovery is possible with a >99.0% purity. In prior art methods, pumping $CO_2$ into brines at atmospheric pressure is known to simply acidify the solution. This dissolves various undesired materials into the solution and/or precipitate unwanted solids, making Li recovery more complex (minimally controllable) and less pure.

In embodiments, after the $CO_2$ mixes with the natural brine the mixture is held 106 for a first predetermined time. The first predetermined time begins after the $CO_2$ injection and lasts for the length of time necessary such that impurities in the natural brine precipitate as solids. Preferably, the first predetermined time is greater than 20 minutes. This leaves a second brine substantially comprising dissolved lithium ions and dissolved chlorine ions. The solid precipitate impurities from the second brine are screened out 108. Embodiments include a sieve that is used to screen out solid precipitate impurities. Other embodiments include any method that is capable of separating solids from liquids.

The second step of carbonizing the concentrated Li in the second brine requires the second brine to be heated 110, injected 112 with a $CO_2$ gas, held 114, and lithium carbonate precipitate is removed 116.

The second brine is heated 110 to a second predetermined temperature. Embodiments include, the second predetermined temperature is at least 200° C. Other embodiments include, the second predetermined temperature is at least 200° C. In one or more embodiments, the second predetermined temperature is equal to or greater than 260° C. In other embodiments, the second predetermined temperature is equal to the first predetermined temperature. A $CO_2$ gas is injected 112 into the second brine. The $CO_2$ gas mixes with the second brine forming a second mixture such that the $CO_2/P$ is greater than 50 g/atm. Preferably, the $CO_2/P$ is greater than 200 g/atm. The second mixture is held 114 for a second predetermined time after the $CO_2$ injection such that chlorine is suppressed and remains as dissolved ions while lithium ions precipitate out as lithium carbonate as substantially the only solid in the second mixture. Embodiments include, the second predetermined time is at least 3 minutes. Exemplary embodiments include, the second predetermined time is at least 20 minutes. In other embodiments, the second predetermined time is equal to the first predetermined time. Lithium carbonate precipitate is removed 116 from the second mixture.

Figure 2:
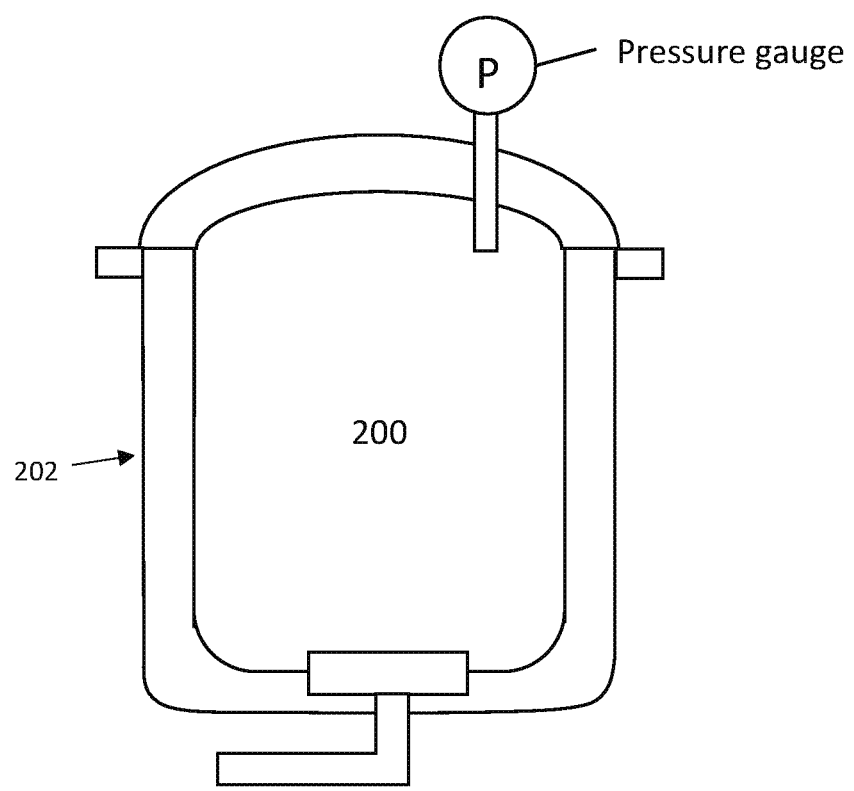
FIG. 2 illustrates a first vessel used to treat brine in accordance with one embodiment of the present inventions.

One embodiment discloses heating a brine 200 to 260° C. in a container vessel 202 that contains only the brine 200 as illustrated in FIG. 2. The temperature is preferred to be higher than 200° C., but may be within a range of 20-200 ° C.

Figure 3:
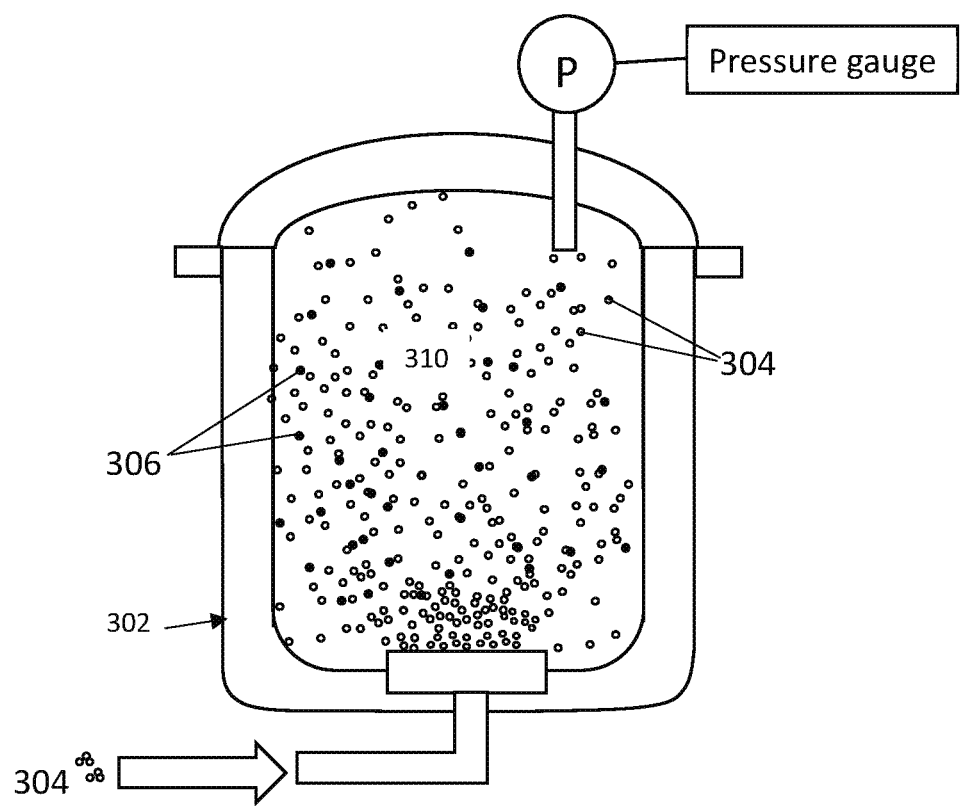
FIG. 3 illustrates the first vessel of FIG. 2 with $CO_2$ injected therein in accordance with one embodiment.

$CO_2$ gas 304 is injected into the vessel 302 to be mixed with the brine 300 to create a mixture 310 at 260° C. in such a way that $CO_2/P$>6 g/atm or preferentially >18 g/atm as illustrated in FIG. 3. The mixture 310 is held under these conditions at least 3 minutes after $CO_2$ injection, or preferentially longer than 20 minutes. At this stage, undesired elements (or impurities), including, but not limited to, K, Na, Ca, Mg, Ba, Fe, Al, and so on, from the brine, precipitate as solids 306 while only lithium ions ($Li^+$) and chlorine ions ($Cl^-$) remain dissolved in the mixture 310.

Figure 4:
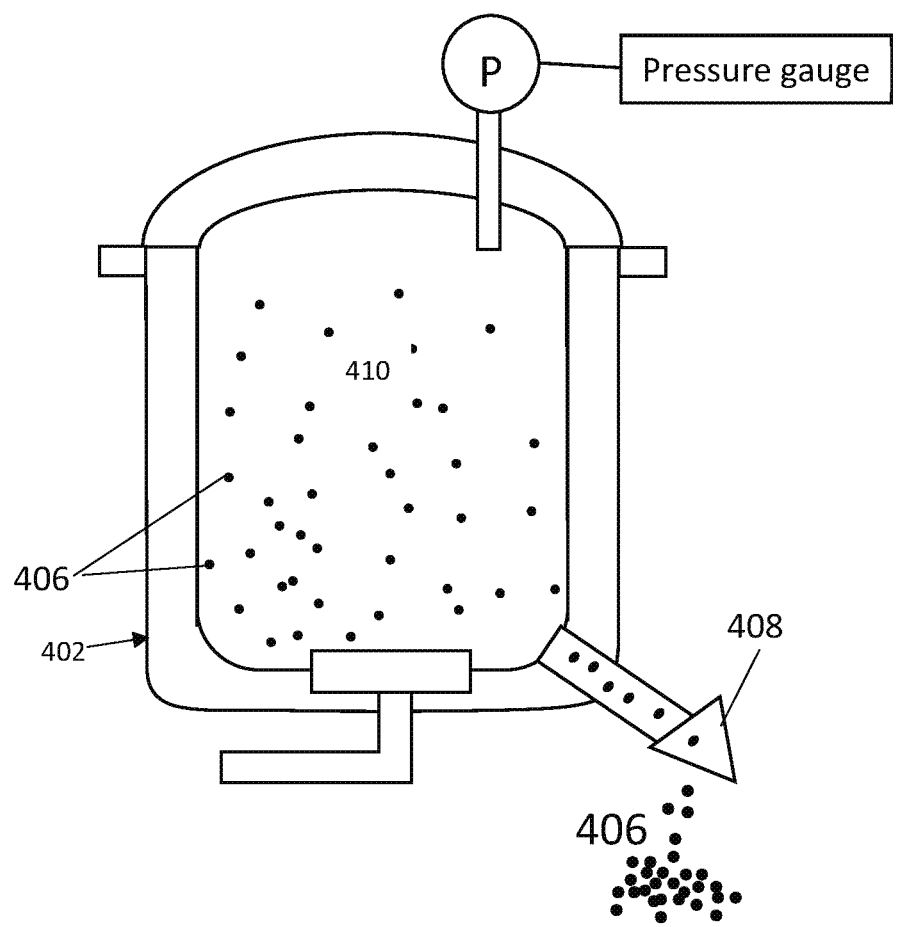
FIG. 4 illustrates the first vessel of FIGS. 2 & 3 depicting the mixture being screened of precipitates.

The precipitates 406 are screened out as illustrated in FIG. 4 at the screen 408. The pressure may be maintained until precipitate 406 screening 408 is complete to minimize solid dissolution back into the mixture 410. At this stage, there are only chlorine and lithium present in the brine as major elements.

Figure 5:
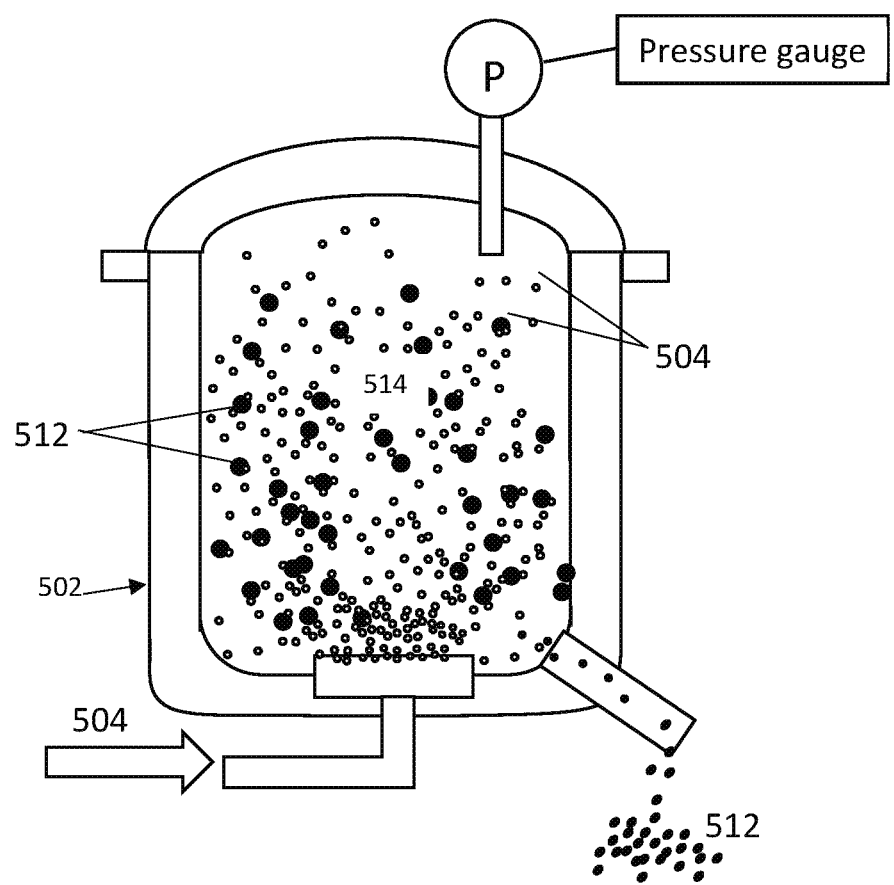
FIG. 5 illustrates the first vessel of FIGS. 2-4 illustrating $CO_2$ gas being injected therein and lithium carbonate precipitates being removed from the mixture.

$CO_2$ 504 gas is injected into the vessel 502 to be mixed with the mixture 514 at 260° C. in such a way that $CO_2/P$>50 g/atm or preferentially >200 g/atm as illustrated in FIG. 5. The mixture 514 is held under these conditions for at least 3 minutes after $CO_2$ 504 injection, or preferentially longer than 20 minutes. At this stage, one of the only two remaining elements in the mixture 514, chlorine is suppressed and remains as dissolved ions ($Cl^-$) while lithium precipitates 512 out as lithium carbonate ($Li_2CO_3$) as the only solid in the mixture 512.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto.

We claim:

1. A method for generating lithium from a natural brine, comprising:
   heating a natural brine in a first vessel to a first predetermined temperature;
   injecting a $CO_2$ gas into the first vessel, the $CO_2$ gas mixes with the natural brine forming a mixture such that the $CO_2/P$ is greater than 6 g/atm;
   holding the mixture for a first predetermined time after the $CO_2$ injection such that impurities in the natural brine precipitate as solids leaving a second brine substantially comprising dissolved lithium ions and dissolved chlorine ions;
   screening out the solid precipitate impurities from the second brine;
   heating the second brine to a second predetermined temperature;
   injecting $CO_2$ gas into the second brine, the $CO_2$ gas mixes with the second brine forming a second mixture such that the $CO_2/P$ is greater than 50 g/atm;
   holding the second mixture for a second predetermined time after the $CO_2$ injection such that chlorine is suppressed as dissolved ions while lithium ions precipitate out as lithium carbonate as substantially the only solid in the second mixture; and
   removing the lithium carbonate precipitate.

2. The method for generating lithium from a natural brine of claim 1 wherein said first predetermined temperature is at least 200° C.

3. The method for generating lithium from a natural brine of claim 1 wherein said first predetermined temperature is equal to or greater than 260° C.

4. The method for generating lithium from a natural brine of claim 1 wherein said $CO_2/P$ of the first mixture is greater than 18 g/atm.

5. The method for generating lithium from a natural brine of claim 1 wherein said first predetermined time is longer than 3 minutes.

6. The method for generating lithium from a natural brine of claim 1 wherein said first predetermined time is longer than 20 minutes.

7. The method for generating lithium from a natural brine of claim 1 whereby said step of screening comprises moving the mixture into a second vessel.

8. The method for generating lithium from a natural brine of claim 1 whereby said step of screening comprises filtering the mixture through a sieve.

9. The method for generating lithium from a natural brine of claim 1 wherein said second predetermined temperature is equal to the first predetermined temperature.

10. The method for generating lithium from a natural brine of claim 1 wherein said second predetermined temperature is at least 200° C.

11. The method for generating lithium from a natural brine of claim 1 wherein said second predetermined temperature is equal to or greater than 260° C.

12. The method for generating lithium from a natural brine of claim 1 wherein said $CO_2/P$ of the second mixture is greater than 200 g/atm.

13. The method for generating lithium from a natural brine of claim 1 wherein said second predetermined time is at least 3 minutes.

14. The method for generating lithium from a natural brine of claim 1 wherein said second predetermined time is at least 20 minutes.

15. The method for generating lithium from a natural brine of claim 1 whereby substantially all of the lithium from the natural brine is recovered as $Li_2CO_3$ with a greater than 99.0% purity of the recovered lithium.

* * * * *